Figure 1:
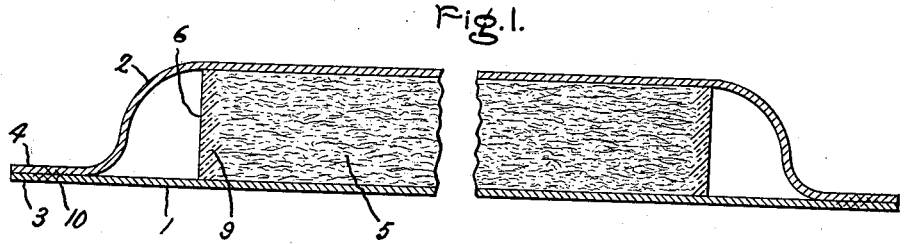

Jan. 25, 1955    H. P. BOVENKERK    2,700,633
INSULATING STRUCTURE AND METHOD OF FORMING SAME
Filed May 2, 1952

Inventor:
Harold P. Bovenkerk,
by
His Attorney.

United States Patent Office 2,700,633
Patented Jan. 25, 1955

2,700,633

INSULATING STRUCTURE AND METHOD OF FORMING SAME

Harold P. Bovenkerk, Ballston Lake, N. Y., assignor to General Electric Company, a corporation of New York Application May 2, 1952, Serial No. 285,707

6 Claims. (Cl. 154—116)

My invention relates to vacuum insulated structures, and more particularly to arrangements for facilitating satisfactory manufacture thereof.

Vacuum insulated structures for panels may be made with a filler material of glass fiber for supporting the walls of the panel against external atmospheric pressure, for example, in accordance with the invention described and claimed in the copending application of Herbert M. Strong and Francis P. Bundy, Serial No. 236,788, filed July 14, 1951, and assigned to the General Electric Company, the assignee of the present invention. It is to be understood that my invention is an improvement over the invention of the Strong and Bundy application, and therefore, I do not herein claim as my invention anything shown or described in said Strong and Bundy application, which is to be regarded as prior art with respect to the present application. Broadly stated, the insulating structure of the Strong and Bundy application includes two spaced walls welded together at their edges to provide a sealed envelope and a filler material within the envelope for supporting the walls against external atmospheric pressure in a manner which minimizes heat conductivity between the walls.

In order to maintain the thermal conductivity of such structures at a very low value over long periods of contemplated use, it is necessary that the pressure within the panel be kept below a predetermined maximum. In order to maintain this very low pressure over a long period, it is, of course, essential that the panel or insulating structure be perfectly sealed. Such a satisfactory seal, in turn, depends upon the securing of a perfect weld between the abutting edges of the two walls forming the panel structure. It has been found that, with the filler material referred to above, small pieces of glass fiber and glass shot may get into the weld area, and the presence of such material in the weld area has a deleterious effect on the weld nugget, increasing the possibility of an imperfect weld and hence the possibility of an imperfect seal. In accordance with my invention, a filler material structure is provided which minimizes the entry of such glass fibers and glass shot into the weld area.

It is an object of my invention to provide, in connection with vacuum insulated structures, an improved arrangement for insuring a satisfactory weld of the envelope of such structures.

It is another object of my invention to provide an improved arrangement for minimizing entry of glass fibers and glass shot from a filler material into the weld area of a sealing envelope of a vacuum insulated structure or panel.

Further objects and advantages of my invention will become apparent as the following description proceeds and the features of novelty which characterize my invention will be pointed out with particularity in the claims annexed to and forming part of this specification.

In carrying out the objects of my invention, the peripheral walls of the glass fiber batt of heat insulating material are singed with a hot flame so as to fuse a thin layer of glass along the edges. This fused layer blocks movement of glass fibers and glass shot from the remainder of the filler material into the weld area.

Figure 2:
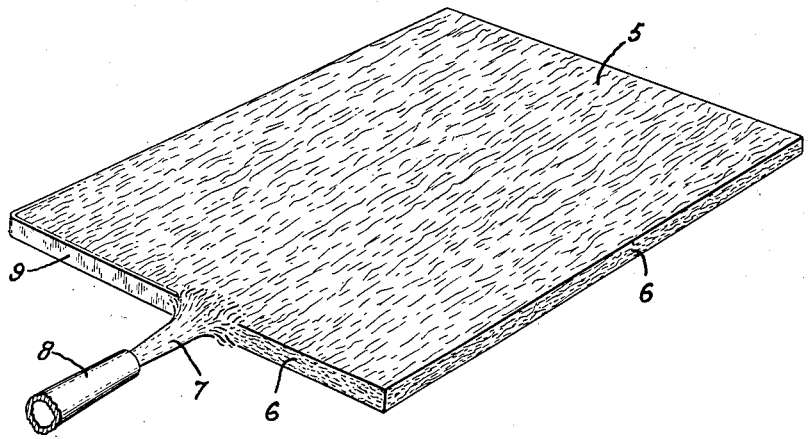

For a better understanding of my invention, reference may be had to the accompanying drawing in which Fig. 1 is a sectional view of an insulating structure or panel incorporating an embodiment of my invention, and Fig. 2 is a view illustrating a method of preparing filler material in accordance with my invention.

Referring to the drawing, there is shown an insulating structure or panel comprising spaced walls 1 and 2. The abutting edges 3 and 4 respectively of these walls are adapted to be welded to seal the envelope formed by the walls, so that the low pressure established therein during factory evacuation will be retained over a long period of time.

In order to support the walls 1 and 2 in spaced relationship against the external atmospheric pressure, a batt 5 of filler material is disposed in the space between the walls 1 and 2. This batt of filler material may be, for example, of the type disclosed in the aforementioned Strong and Bundy application, comprising a plurality of glass fibers randomly oriented or arranged in planes substantially parallel to the spaced apart walls 1 and 2. The batt 5 is, of course, highly compressed in supporting the heavy load of the external atmospheric pressure, and it has been found that some of the fibers may be broken during such compressive action and the small pieces of fiber may find their way into the weld area. In addition, glass shot present in the filler material may also find its way into the weld area. It has been further found that welds made with the presence of these glass fibers or glass shot in the weld area are not perfect, and there is danger of poor sealing and of leakage into the panel, thereby greatly reducing its insulating value.

In accordance with my invention an arrangement is provided which minimizes the possibility of entry of such glass fibers or glass shot into the weld area without substantially adversely affecting the insulative effectiveness of the batt 5. In carrying out my invention, the peripheral walls 6 of the batt 5 of filler material which extend transverse the planes of the glass fibers and between the spaced walls 1 and 2 are heated or singed by a hot flame 7 of a torch 8, illustrated generally in Fig. 2. This results in fusing a thin layer of glass fibers along these walls of the batt into a relatively solid thin layer 9 which extends around the batt and between the walls 1 and 2. This thin layer 9, being composed of the fused glass fibers, is relatively impervious. Hence small glass fibers and shot in the central portion of the filler material within the confines of the bounding peripheral layer 9 are blocked from entry into the weld area 10 which is beyond or outside of the bounding layer 9. Accordingly the possibility of imperfect welds resulting from glass fibers or glass shot in the weld area is minimized.

A flame of sufficiently high temperature to effect the necessary singeing and fusing of a very thin layer 9 around the periphery of the batt 5 may be employed. By way of example, the filler material may be prepared by utilizing a torch which supplies an oxygen-hydrogen flame. The flame is directed toward the edges 6 of the batt 5 and the torch is moved quickly around the entire periphery of the batt so that only a very thin layer of singed or fused glass fibers is formed at the peripheral walls 6 of the batt. The layer of singed or fused glass is kept thin in order to minimize the solid conduction of heat between the walls 1 and 2 and thereby minimize any adverse effects of the singeing or fusing on the overall insulative effectiveness of the batt 5.

In manufacturing a vacuum panel incorporating the filler material of my invention, the batt 5 is first treated with a flame as described above. The treated batt with its thin peripheral layer 9 is then placed within the space between the walls 1 and 2 of the panel structure, the thin layer 9 extending between the walls 1 and 2 all around the batt and thereby blocking movement of small glass fibers and glass shot on the central portion of the filler material into the weld area 10. The edges 3 and 4 are held in abutting relationship and are welded together by the use of any suitable welding apparatus. The panel is then evacuated in any one of a number of manners well-known in the art giving the resultant structure of great strength and excellent thermal insulating properties. By way of example, the panel could be formed to include an evacuation tube (not shown) by means of which a connection could be made to any suitable evacuation system. Then the panel could be evacuated for approximately 20 or 30 minutes while being baked in an oven at around 570° F. The baking would be effective for driving out both free and absorbed gases in the materials of the structure. Following evacuation in this manner, the evacuation tube on the panel could be sealed and the evacuation system disconnected.

While I have shown and described a specific embodiment of my invention, I do not desire my invention to be limited to the particular construction shown and described and I intend by the appended claims to cover all modifications within the spirit and scope of my invention.

What I claim as new and desire to secure by Letters Patent of the United States is:

1. An insulating structure of the vacuum type comprising a pair of spaced walls having abutting edges, said edges being adapted to be welded to provide a sealed envelope, a batt of glass fiber filler material in the space between said walls for supporting said walls against external atmospheric pressure, the glass fibers of said batt being in planes substantially parallel to said pair of spaced walls, said batt including peripheral walls extending between said pair of spaced walls, the glass fibers forming said peripheral walls being fused together to block entry of glass fibers and glass shot from the central portion of said batt into the weld area.

2. An insulating structure of the vacuum type comprising a pair of spaced walls having abutting edges, said edges being adapted to be welded to provide a sealed envelope, and a batt of filler material in the space between said walls for supporting said walls against external atmospheric pressure, said batt of filler material comprising a central portion including a plurality of glass fibers in planes substantially parallel to said pair of spaced walls and a thin peripheral wall portion completely bounding the periphery of said central portion, said peripheral wall portion extending between said pair of spaced walls and being composed of fused glass fibers for blocking entry of glass fibers and glass shot from said central portion into the weld area.

3. The method of forming an insulating structure which comprises providing a batt of glass fiber insulating material, moving a flame along the peripheral walls of said batt to fuse the glass fibers into a thin peripheral layer at said walls, placing said batt within an envelope, welding the edges of said envelope to seal said envelope, and evacuating said envelope.

4. The method of forming a batt of filler material for use in a sealed vacuum insulating panel which comprises providing a batt including a plurality of elongated glass fibers arranged in substantially parallel planes, and singeing the peripheral walls of said batt extending transverse the planes of said fibers with a flame to form a thin peripheral layer of fused glass fibers surrounding the periphery of the central portion of said batt.

5. The method of forming an insulating structure which comprises providing a batt of glass fiber insulating material, moving an oxygen-hydrogen flame along the peripheral walls of said batt to fuse the glass fibers into a thin peripheral layer at said walls, placing said batt within an envelope, welding the edges of said envelope to seal said envelope, and evacuating said envelope.

6. The method of preparing a batt of glass fiber filler material in which the glass fibers are arranged in substantially parallel planes for use in a sealed vacuum insulating panel which comprises singeing the peripheral walls of said batt extending transverse the planes of said fibers with an oxygen-hydrogen flame to form a thin peripheral layer of fused glass fibers enclosing the central portion of said batt.

References Cited in the file of this patent

UNITED STATES PATENTS

| Number | Name | Date |
|---|---|---|
| 958,095 | Coleman | Oct. 4, 1910 |
| 1,793,039 | Yetter | Feb. 17, 1931 |
| 2,067,015 | Munters | Jan. 5, 1937 |
| 2,134,009 | Slayter | Oct. 25, 1938 |
| 2,136,170 | Luertzing | Nov. 8, 1939 |
| 2,160,001 | Saborsky | May 30, 1939 |
| 2,202,714 | Nash | May 28, 1940 |
| 2,297,337 | Wiley | Sept. 29, 1942 |
| 2,311,704 | Simison | Feb. 23, 1943 |
| 2,484,003 | Simison | Oct. 4, 1949 |